United States Patent
Hoffman et al.

[15] 3,680,392
[45] Aug. 1, 1972

[54] THREE-AXIS ACCELEROMETER

[72] Inventors: Jay Hoffman, Livingston; Robert M. Hohenstein, Glen Ridge, both of N.J.

[73] Assignee: The Singer Company, New York, N.Y.

[22] Filed: Oct. 8, 1970

[21] Appl. No.: 79,248

[52] U.S. Cl..............................73/516 R, 73/517 B
[51] Int. Cl.............................................G01p 15/08
[58] Field of Search.................73/516 R, 517 B, 505

[56] References Cited

UNITED STATES PATENTS 3,438,267   4/1969   Contensou et al...........73/517 B

*Primary Examiner*—James J. Gill
*Attorney*—S. A. Giarratana and Thomas W. Kennedy

[57] ABSTRACT

A three-axis electrostatic accelerometer in which a proof mass is adapted to move relative to a casing with respect to three reference positions established along three coordinate axes, in response to accelerations along these axes. A signal is generated in response to the proof mass movement, and the proof mass is restored to a null position by means of an electrostatic force.

3 Claims, 5 Drawing Figures

PATENTED AUG 1 1972 3,680,392

INVENTORS
JAY HOFFMAN &
ROBERT M. HOHENSTEIN

BY S. A. Giarratana
Thomas W. Kennedy
ATTORNEY

PATENTED AUG 1 1972 3,680,392

INVENTORS
JAY HOFFMAN &
ROBERT M. HOHENSTEIN

BY S. A. Giarratana
Thomas W. Kennedy
ATTORNEY

3,680,392

THREE-AXIS ACCELEROMETER

BACKGROUND OF THE INVENTION

This invention relates to an accelerometer, and more particularly to an accelerometer which is adapted to measure acceleration about three coordinate axes.

In the prior art there are inertial grade accelerometers which consist of a seismic mass, or proof mass, supported by an elastic hinge suspension for movement along one or two coordinate axes. Movements of the proof mass relative to its housing in response to accelerations are sensed by means of an electrical pick-off, and a restoring signal is amplified and sent back to a magnetic force generating device acting on the proof mass in a direction to return it to a null position.

However, this type of arrangement requires elastic hinges, magnetic elements, and force-restoring coils which add to the cost of the device, and which have a deleterious effect on the long-term stability and warm-up characteristics of the device. Also in these prior art devices, the proof mass is adapted for movement along no more than two mutually perpendicular coordinate axes, therefore requiring at least two proof masses when it is necessary to measure accelerations about three axes. This, of course, increases the above disadvantages, and also adds to the size and weight of the instrument.

SUMMARY OF THE INVENTION

It is therefore an object of the present invention to provide an accelerometer which is adapted for measuring acceleration about three axes, yet only requires a single proof mass.

It is a further object of the present invention to provide an accelerometer of the above type which enjoys good long-term stability and warm-up characteristics, yet is relatively low in cost.

Toward the fulfillment of this object, the accelerometer of the present invention comprises a casing; a proof mass disposed in said casing; means to establish a reference position for said proof mass with respect to each of three coordinate axes, said proof mass being adapted to move relative to said casing and with respect to said reference positions in response to accelerations along said axes; and means to generate a signal in response to said movement.

BRIEF DESCRIPTION OF THE DRAWINGS

Reference is now made to the accompanying drawings for a better understanding of the nature and objects of the present invention. The drawings illustrate the best mode presently contemplated for carrying out the objects of the invention and are not to be construed as restrictions or limitations on its scope. In the drawings.

DESCRIPTION OF THE PREFERRED EMBODIMENTS

Figure 1:
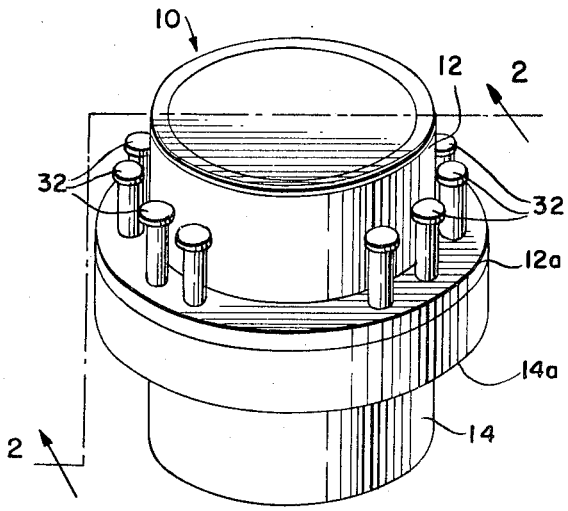
FIG. 1 is a perspective view of the accelerometer of the present invention.

Referring to FIGS. 1–4 of the drawings, the reference numeral 10 refers in general to the accelerometer of the present invention, which comprises an upper housing portion 12 and a lower housing portion 14 which are joined together in any known manner.

A proof mass, in the form of a sphere 16, is disposed in a spherical cavity 18 defined by the housing portions 12 and 14 in their assembled condition, with the inner wall of the cavity 18 having a slightly larger diameter than that of the sphere 16.

Figure 3:
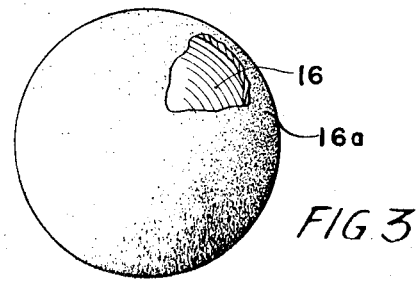
FIG. 3 is a perspective view of the proof mass utilized in the accelerometer of FIGS. 1 and 2.

As better shown in FIG. 3, a membrane 16a extends around the sphere 16 and may be of a suitable cationic-type material which is sufficiently conductive to serve as one electrode of a capacitor, as will be described in detail later.

A dielectric liquid of low viscosity such as acetonitrile $C_2H_3N$ is disposed in the gap between the membrane 16a and the wall defining the cavity 18, it being understood that the housing portions 12 and 14 are constructed of a stable nonconductive material compatible with the dielectric liquid, such as quartz or glass.

Within the cavity of the housing are three separate pairs of conductive regions which are formed in such a way that their axes of symmetry lie along three mutually perpendicular axes, each passing through the center of the cavity 18. These regions are defined by a plurality of cup-shaped plates, each of which is fixed to the wall defining the cavity 18. Specifically, a plate 20a is provided with its axis coincidental with a first coordinate axis designated by the reference letter A. An annular plate 22a surrounds the plate 20a and is insulated therefrom, with its axis of symmetry also extending coincidental with the coordinate axis A. In a similar manner a plate 20b and an annular plate 22b are located in a diametrically opposed position to the plates 20a and 22a, respectively.

A pair of diametrically opposed plates 24a and 24b are positioned with their axes of symmetry lying along a coordinate axis B which is perpendicular to the coordinate axis A. A pair of annular plates 26a and 26b extend around the plates 24a and 24b, respectively, and are coaxial therewith.

Figure 2:
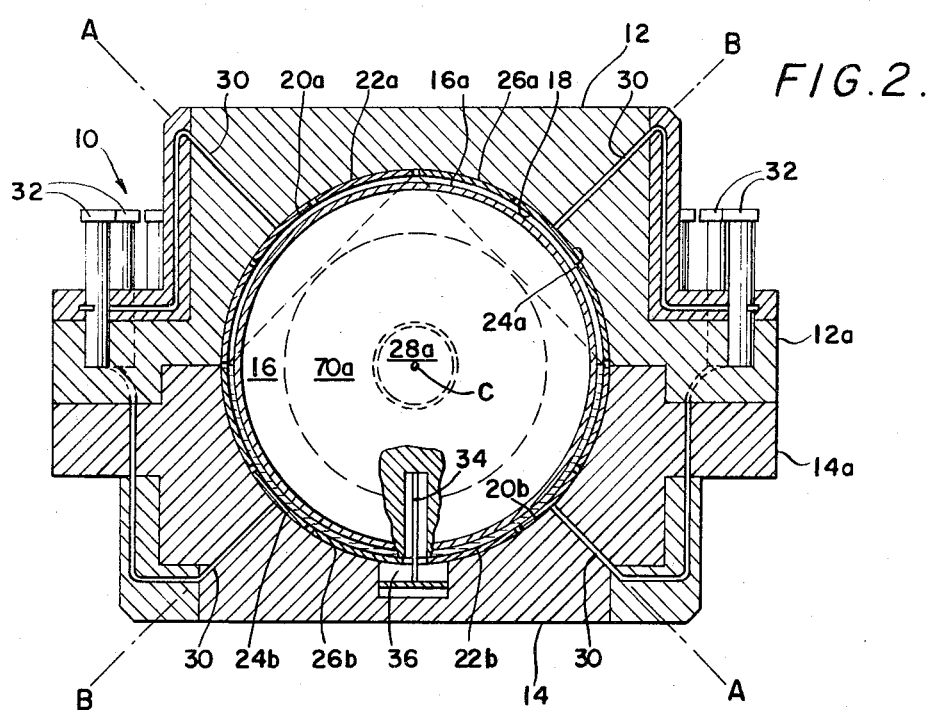
FIG. 2 is a sectional view taken along the line 2—2 of FIG. 1.
Figure 4:
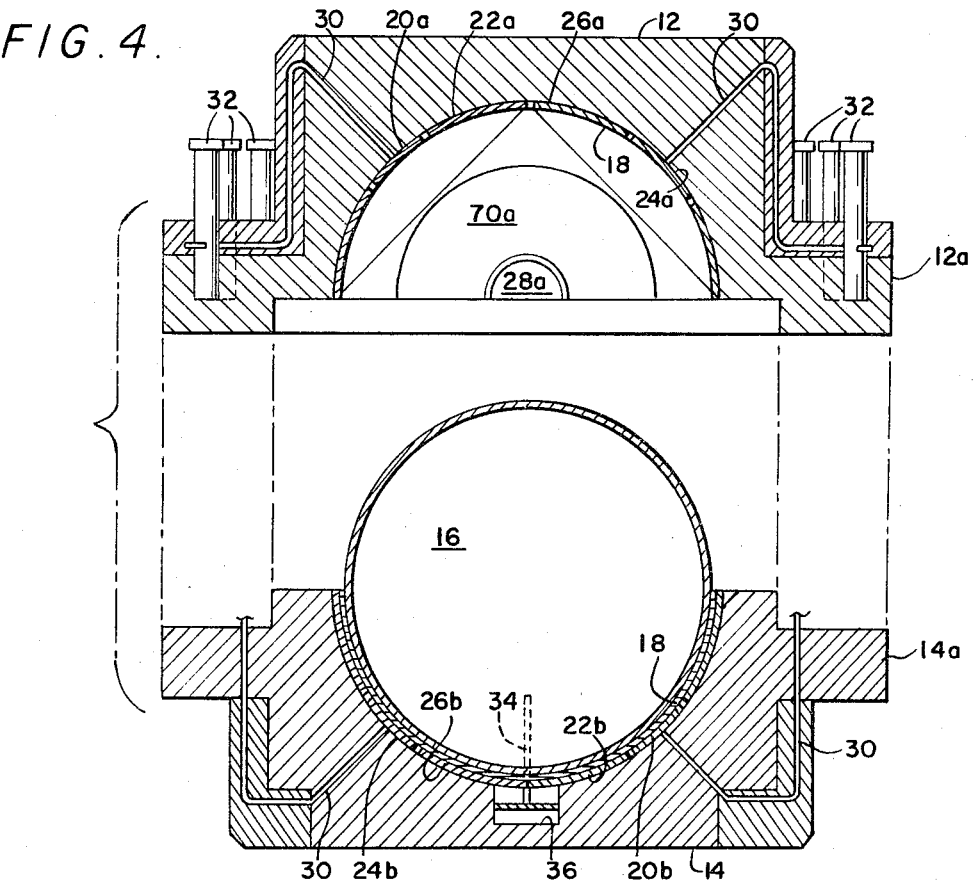
FIG. 4 is an exploded view of the structure depicted in FIG. 2.

Two additional pairs of plates are provided on the wall defining the cavity 18, with their axes of symmetry coinciding with a third coordinate axis C extending perpendicular to the axes A and B and to the plane of the paper as viewed in FIG. 2. Of this group, only the plate 28a and the annular plate 70a coaxially surrounding same are shown in FIGS. 2 and 4, it being understood that a corresponding pair of plates are disposed diametrically opposite thereto.

Each of the plates 20a, 20b, 24a, 24b, and 28a forms a pick-off capacitor with the sphere 16, while each of the annular plates 22a, 22b, 26a, 26b, and 70a forms a restoring capacitor with the sphere in a manner that will be explained in greater detail later.

In order to establish an electrical circuit between the plates and the sphere 16, a plurality of electrical conductors 30 are disposed in corresponding openings formed in the housing portions 12 and 14, and connect the plates 20a, 20b, 24a, 24b, and 28a to a number of terminals 32 carried by the flange 12a. It is understood that similar connections (not shown) are provided for the annular plates 22a, 22b, 26a, 26b, and 70a with the corresponding conductors also extending to respective terminals carried by the flange portion 12.

A conductor 34, in the form of a pigtail, is electrically connected to the sphere 16 and extends outward into a cavity 36 formed in the lower housing 14 for connection to external circuitry.

Figure 5:
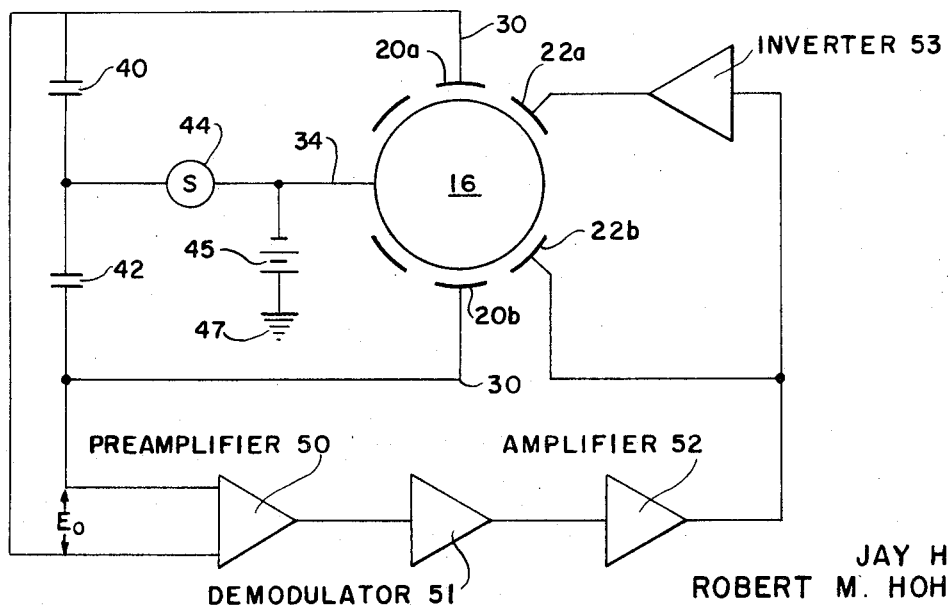
FIG. 5 is a schematic representation of the accelerometer of FIGS. 1–4, together with electrical circuitry providing acceleration sensing and force balancing.

The electrical circuit associated with the structure of FIGS. 1-4 is depicted in FIG. 5, with only the structure and circuitry for determining acceleration along the coordinate axis A being shown and described, in the interest of clarity. Specifically, each of the plates 20a and 20b forms an electrical capacitor with the sphere 16, which capacitors are connected, via the conductors 30, as capacitive legs of an electrical bridge circuit. This circuit includes an additional capacitor 40 connected in series with capacitor 16-20a and an additional capacitor 42 connected in series with capacitor 16-20b. Suitable electrical excitation in the form of an alternating potential is supplied by a source 44 connected across the pairs of capacitors 40 and 16-20a, and 42 and 16-20b connected in parallel, the connection to sphere 16 being made by conductor 34. To achieve various degrees of linearity a negative direct current (D.C.) potential 45 of suitable magnitude is connected between the proof mass sphere 16 by means of conductor 34 and ground, 47. The capacitors 40 and 42 are preferably of equal capacitance, and the null position of the sphere 16 is a position equidistant from the plates 20a and 20b whereby the capacitors 16-20a and 16-20b are also of equal value.

Therefore, the output potential $E_o$ of the bridge circuit taken across the junction of the two sets of serially connected capacitors is substantially zero in the null position of the sphere 16. Any displacement of the sphere 16 from this position, however, results in either a positive or negative output potential $E_o$, depending upon the direction of displacement. Of course, the output potential may be detected in any known manner to provide an indication of acceleration.

To restore the sphere 16 to its null position after a predetermined acceleration, the output potential $E_o$ is amplified by preamplifier, 50 to an appropriate level, demodulated by a demodulator circuit 51 of any conventional type and amplified to an appropriate level by an amplifier 52. The output of the amplifier is connected to plate 22b and the input of an inverter 53. The output of the inverter is connected to plate 22a. The signals impressed on plates 22a and 22b by the inverter 53 and amplifier 52 respectively act in combination to force the sphere 16 to its null position.

In operation of the restoring circuit, when the sphere 16 is displaced along the axis A in response to acceleration along this axis, the output from the amplifier 52 is proportional to this displacement, is of a polarity corresponding to the direction of displacement, and is effective to increase the potential applied to one of the plates 22a or 22b. For example, if the sphere 16 is displaced relative to the housing from a null position downwardly as viewed in FIG. 4, the output potential of amplifier 52 would be of a negative polarity, thus increasing the potential applied to the plate 22a and reducing the potential applied to the plate 22b. In this case, the electrostatic force of the capacitor formed by the sphere 16 and the plate 22a is increased, which force acts on the proof mass to restore same to a null position.

It is understood that the plates and circuitry associated with the B and C axes are the same as described above. Also in the above example, reference is made to movement of the sphere 16 for convenience of presentation, it being understood that in a great majority of applications, the housing formed by the portions 12 and 14 actually moves in a particular direction relative to the sphere in response to accelerations in the same direction.

The advantages of the accelerometer disclosed above are many. For example, the cost is considerably reduced from that of the prior art devices described above due to the extreme simplicity of the pick-off and force-generating mechanisms and the use of a single proof mass. Also, there are no magnetic elements, coils or elastic hinge-suspension members as in the prior art devices. Moreover, the accelerometer of the present invention utilizes a relatively low amount of power, since it is a completely capacitive device and thereby utilizes relatively low current. Further, the accelerometer of the present invention can be packaged in a size 0.375 inches by 0.425 inches, and because of its simplicity is rugged in any handling environment.

As a further advantage, the accelerometer of the present invention enjoys relative rapid warm-up characteristics with respect to the prior art, since the latter's principal source of warm-up delay are elastic hinge bias temperature sensitivities, magnetic temperature sensitivities, and restoring coil resistance variations with temperature. Also, the accelerometer of the present invention enjoys long-term stability, since it is not susceptible to magnetic aging, etc.

It has also been discovered that in utilizing the three-axis accelerometer of the present invention, the scale factor may be linearized by eliminating the most dominant nonlinearity coefficient, thus rendering the scale factor virtually insensitive to bias voltage variations. Thus, the accelerometer of the present invention can easily tolerate bias voltage instabilities which otherwise could not be tolerated in prior art devices.

Of course, variations of the specific construction and arrangement of the accelerometer disclosed above can be made by those skilled in the art without departing from the invention as defined in the appended claims. For example, the accelerometer can be simplified mechanically by removal of the conductor 34 from the proof mass with the alternating current potential source 44 now connected between capacitors 40 and 42 and ground 47. The D.C. potential of the proof mass sphere 16 required for system linearity can be established by applying positive and negative D.C. potentials to the annular plates 22a, 26a, 70a and 22b, 26b, 70b (not shown) or to an additional electrode (not shown) in near proximity to the proof mass.

As a second example, alternating voltage can be used in the biasing and drive circuits in place of D.C. voltage. In this way, the accelerometer can function without the membrane, 16a.

We claim:

1. A three-axis accelerometer comprising a casing having an inner surface of spherical shape and having three coordinate axes arranged in quadrature, a proof mass having an outer surface of spherical shape and disposed in said casing forming a gap of spherical shape therebetween, force means to establish a reference position for said proof mass with respect to each of said three coordinate axes, said proof mass being adapted to move relative to said casing and with respect to said reference position in response to accelerations along said axes, pickoff means to generate a signal in response to said movement, said force means comprising at least three fixed ring-shaped capacitor plates fixedly mounted on said casing in proximity to said proof mass, said three force capacitor plates being arranged respectively along said three axes, each said force capacitor plate forming an electrical capacitor with at least a portion of said proof mass, said pickoff means comprising at least three fixed capacitor plates fixedly mounted on said casing in proximity to said proof mass, said three pickoff capacitor plates being arranged respectively along said three axes, each of said three pickoff capacitor plates being respectively coaxial with and surrounded by one of said three force capacitor plates, each said pickoff capacitor plate forming an electrical capacitor with at least a portion of said proof mass, means to establish an electrical circuit including said pickoff capacitor plates and said force capacitor plates, said movement of said proof mass adapted to vary the capacitances of said pickoff capacitor plates and to generate respective signals, said force capacitor plates being respectively responsive to said signal of its respective coaxial pickoff plate for applying an electrostatic force along its respective axis to said proof mass to realign said proof mass to its reference position, wherein said spherical gap between the proof mass and the casing contains a dielectric liquid, and wherein said proof mass includes an inner core portion and includes an outer membrane portion having an outer surface of spherical shape, said membrane portion being composed of a cationic-type material.

2. The accelerometer of claim 1 wherein said proof mass has a conductor, said conductor having one end fixedly connected to said proof mass inner portion and having an intermediate portion extending through said dielectric liquid and having an opposite end portion fixedly mounted on said casing, said conductor being composed of a flexible material.

3. The accelerometer of claim 2 wherein said casing is composed of a non-conductive material, said casing material being stable when in contact with said dielectric liquid, and wherein said dielectric liquid is composed of acetonitrile, and wherein said proof mass inner portion is composed of a metal.

\* \* \* \* \*